United States Patent
Das et al.

(10) Patent No.: US 11,206,139 B2
(45) Date of Patent: Dec. 21, 2021

(54) SYSTEM AND METHOD FOR ELECTRONIC SIGNATURES AS A SERVICE

(71) Applicant: ServiceNow, Inc., Santa Clara, CA (US)

(72) Inventors: Santosh Kumar Das, Hyderabad (IN); Chakradhar Narasimha Jillellamudi, Hyderabad (IN); Raghavan Muthuraman, Bangalore (IN)

(73) Assignee: ServiceNow, Inc., Santa Clara, CA (US)

(*) Notice: Subject to any disclaimer, the term of this patent is extended or adjusted under 35 U.S.C. 154(b) by 301 days.

(21) Appl. No.: 16/294,685

(22) Filed: Mar. 6, 2019

(65) Prior Publication Data
US 2020/0287721 A1 Sep. 10, 2020

(51) Int. Cl.
| H04L 9/32 | (2006.01) |
| G06Q 10/10 | (2012.01) |
| H04L 9/08 | (2006.01) |

(52) U.S. Cl.
CPC ......... H04L 9/3247 (2013.01); G06Q 10/103 (2013.01); H04L 9/083 (2013.01); H04L 9/3213 (2013.01)

(58) Field of Classification Search
CPC ..... H04L 9/3247; H04L 9/083; H04L 9/3213; G06Q 10/103
See application file for complete search history.

(56) References Cited

U.S. PATENT DOCUMENTS

| 6,990,504 | B2 * | 1/2006 | Powell | G06F 21/606 |
| 7,020,706 | B2 | 3/2006 | Cates | |
| 7,350,209 | B2 | 3/2008 | Shum | |
| 7,600,124 | B2 * | 10/2009 | Karimisetty | G06F 16/81 |
| | | | | 713/176 |
| 7,716,353 | B2 | 5/2010 | Golovinsky | |
| 7,769,718 | B2 | 8/2010 | Murley | |
| 7,890,802 | B2 | 2/2011 | Gerber | |
| 7,925,981 | B2 | 4/2011 | Pourheidari | |
| 8,402,127 | B2 | 3/2013 | Solin | |
| 8,612,408 | B2 | 12/2013 | Trinon | |
| 8,832,652 | B2 | 9/2014 | Mueller | |
| 9,065,783 | B2 | 6/2015 | Ding | |
| 9,098,322 | B2 | 8/2015 | Apte | |
| 9,122,552 | B2 | 9/2015 | Whitney | |
| 9,317,327 | B2 | 4/2016 | Apte | |
| 9,363,252 | B2 | 6/2016 | Mueller | |
| 9,535,737 | B2 | 1/2017 | Joy | |
| 9,645,833 | B2 | 5/2017 | Mueller | |
| 9,654,473 | B2 | 5/2017 | Miller | |
| 9,692,757 | B1 * | 6/2017 | Mikulski | H04L 9/3242 |
| 9,766,935 | B2 | 9/2017 | Kelkar | |

(Continued)

Primary Examiner — Matthew Smithers
(74) Attorney, Agent, or Firm — Fletcher Yoder PC

(57) ABSTRACT

A computing system includes a server. The server is communicatively coupled to a data repository and is configured to store a data in the data repository. The server is further configured to create, via a visual information flow creation tool, at least one information flow object. The server is additionally configured to create, via the visual information flow creation tool, an electronic signature field in the at least one information flow object, and to provide the at least one information flow object to communicate an electronic signature request to an electronic signature system.

20 Claims, 11 Drawing Sheets

(56) References Cited

U.S. PATENT DOCUMENTS

| | | | | |
|---|---|---|---|---|
| 9,805,202 B2* | 10/2017 | Medeiros | ............ | G06F 21/577 |
| 9,805,322 B2 | 10/2017 | Kelkar | | |
| 10,608,997 B1* | 3/2020 | Sethi | ............ | H04L 63/123 |
| 2003/0093678 A1* | 5/2003 | Bowe | ............ | H04L 9/3236 |
| | | | | 713/180 |
| 2009/0210250 A1* | 8/2009 | Prax | ............ | G16H 15/00 |
| | | | | 705/3 |
| 2010/0153739 A1* | 6/2010 | Guymon, Jr. | ............ | G06F 21/64 |
| | | | | 713/189 |
| 2013/0132230 A1* | 5/2013 | Gibson | ............ | H04L 67/22 |
| | | | | 705/26.8 |
| 2014/0149735 A1* | 5/2014 | Tenenboym | ............ | H04L 9/3268 |
| | | | | 713/156 |
| 2014/0258826 A1* | 9/2014 | Barrus | ............ | G06Q 10/0633 |
| | | | | 715/224 |
| 2015/0229640 A1* | 8/2015 | Jasper | ............ | G06F 21/34 |
| | | | | 726/9 |
| 2016/0197803 A1* | 7/2016 | Talbot | ............ | G06F 16/188 |
| | | | | 709/224 |
| 2016/0204944 A1* | 7/2016 | Follis | ............ | H04L 9/3247 |
| | | | | 713/176 |
| 2018/0081895 A1* | 3/2018 | Kendai | ............ | G06F 8/24 |
| 2020/0067705 A1* | 2/2020 | Brown | ............ | H04L 9/3231 |
| 2020/0244706 A1* | 7/2020 | Young | ............ | G06Q 10/06393 |

* cited by examiner

SYSTEM AND METHOD FOR ELECTRONIC SIGNATURES AS A SERVICE

BACKGROUND

The present disclosure relates generally to signature procurement, and more specifically, to electronic signature procurement as a service.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions. Certain systems may provide for electronic signature by an entity, for example for verification of approval of certain processes by the entity, for record keeping, and so on. It may be useful to improve electronic signature systems.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The electronic signature techniques described herein may include enabling the creation of an electronic signature via an electronic signature interface when using the cloud-based resources, such as the Flow Designer objects. For example, certain flows, such as human resource flows, may benefit from processes that include electronically signing off on one or more documents. Accordingly, a Flow Designer system may include various development "spokes" to develop process flows and a signature "spoke" or interface to provide signature services as part of the process flows.

In certain embodiments, the signature interface may provide for authentication via services such as OAuth services. The OAuth services may provide for token-based authentication and authorization over an internet connection. For example, a user's account information may be used by a third party signature spoke to sign a document without exposing the user's password. OAuth techniques may provide for an access token to authorize sharing of certain information, such as signature related information. Signature events may be provided as envelope events and recipient events. For example, envelope events may include sending an envelope, delivering an envelope, signing an envelope, declining an envelope, and voiding an envelope. Recipient events may include sending to a recipient, a recipient delivery failure event, a recipient delivery event, and a recipient signing event.

Signature account and credential discovery may also be provided. For example, electronic signature templates may be discovered and used when authoring Flow Designer system flows. In certain embodiments, the flows may be used to create flows that include embedded signatures on a document. However, if a non-embedded approach is desired, the techniques described herein may send, e.g., via email a document directly to a recipient for signature. The recipient may then sign the documents, and an event may trigger, acknowledging the signing of the document. An example flow for human resource purposes may include a hiring manager initiating a request for an offer to a candidate by inputting data into certain fields in a document provided by via the flow. The hiring manager may review the request and modify values in the document's fields as desired, and then approve the offer. The offer may then be transmitted to a recipient, e.g., the candidate. The candidate may then review the offer, modify certain fields such as an employment start date, and then electronically sign the offer. The signed document may then be saved in a cloned database and returned to certain users, for example, for further approval based on the start date entry set by the candidate. In this manner, a process, such as a human resources process may be created to include electronic signatures without having to write code. That is, the Flow Designer system may enable the creation of flows without having to type computer code or instructions.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 10 is a screenshot of an embodiment of a GUI showing a list of catalog items that may be provided by querying electronic signature tables; and FIG. 11 is a screenshot of an embodiment of a GUI illustrating multiple fields suitable for entering electronic signature information, for example, into templates.

DETAILED DESCRIPTION OF SPECIFIC EMBODIMENTS

Figure 1:
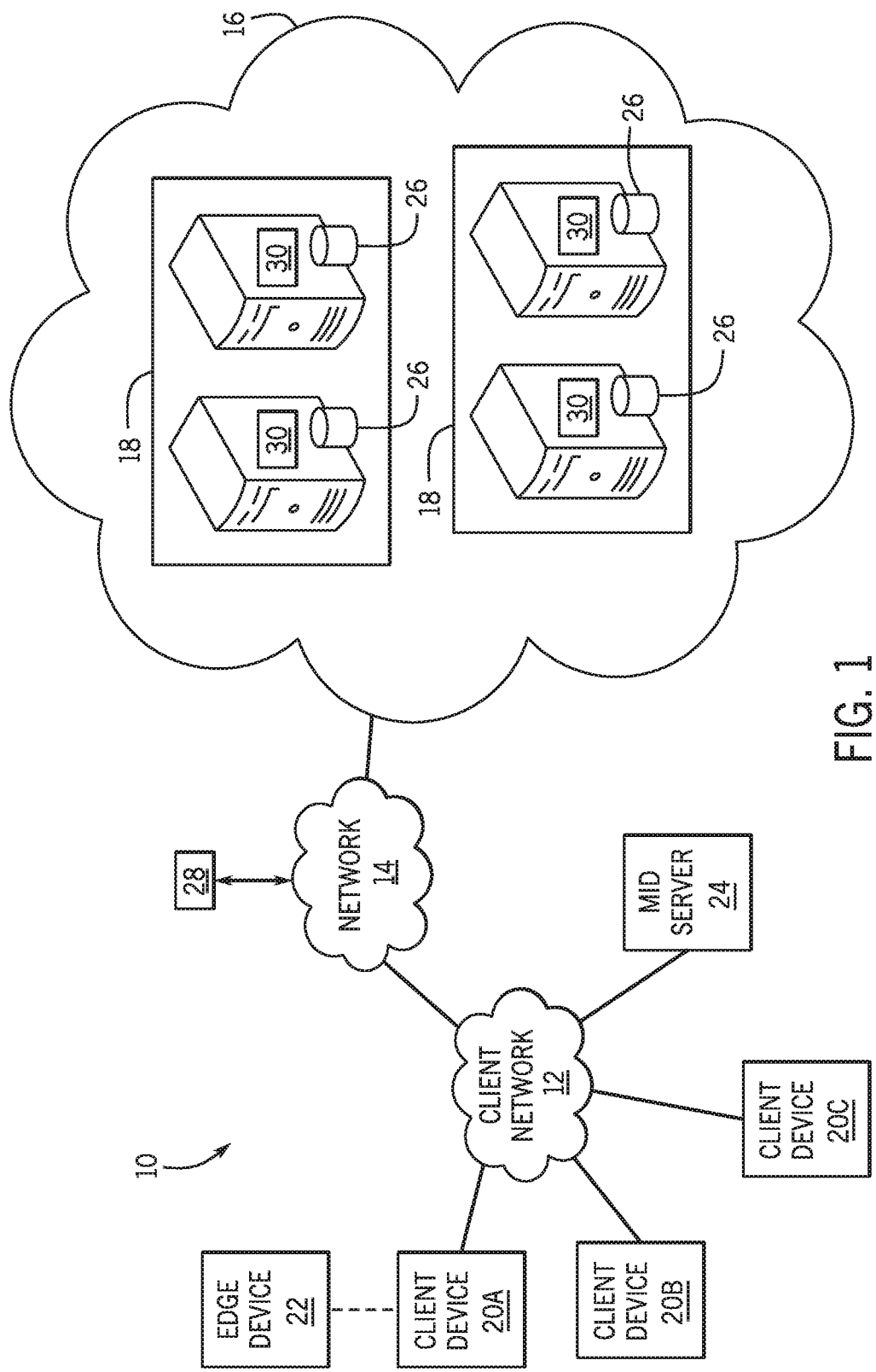
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device that includes, but is not limited to a computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "electronic signature" may refer to an electronic symbol, electronic sound, or process, attached to or logically associated with a contract or other record and executed or adopted by a person with the intent to sign the record. The electronic signature may be specified by certain regulations, such as the Electronic Signatures in Global and National Commerce Act (ESIGN) Act enacted by the United States on Jun. 30, 2000, as part of 15 United States Code (U.S.C). Chapter 96. Certain systems may create templates for subsequent electronic signing. As used herein, the term "template" may refer to a blueprint document for use in more than one transaction involving one or more electronic signatures. The template may be created and stored, for example, by an electronic signature system provided by DocuSign, Inc., of San Francisco, Calif., U.S.A.

As used herein, the term "flow" may refer to data processing of information (e.g., database records) that may be presented to a user in a flow chart-like view. A flow may have inputs but may not have an output. A flow may include one or more "sub-flows" and/or one or more "Actions." The flow may also include "triggers" and control logic. A "sub-flow" as used herein may refer to data processing of information (e.g., database records) also presented to the user in a flow chart-like view. Unlike the flow, a sub-flow may have both inputs and outputs. A sub-flow may additionally contain Actions, triggers, control logic and/or other sub-flows. A "trigger" may be "fired" or turned on by a change in certain conditions, such as a change in one or more database records. The trigger may also be "fired" or otherwise turned on via a schedule, e.g., daily, weekly, monthly schedule. "Action" as used herein may include one or more "Steps." Steps may be self-contained code, such as scripts (e.g., Java, JavaScript code) provided by the manufacturer of the software tools used to create the flows, sub-flows, and the like. Steps may also be provided by users and any other entity. As used herein, the terms "flow objects" may refer to flows, sub-flows, Actions, and Steps.

Present embodiments are directed to providing for the creation, discovery, and/or subsequent use of electronic signatures and/or templates via an electronic signature "spoke." The electronic signature spoke described herein may enable the creation of both embedded electronic signatures and emailed electronic signatures. For example, an embedded electronic signature request may be part of a form in flow. And emailed electronic signature request may be emailed, for example, during execution of a flow. Regardless of signature request type, once a user electronically signs the document, then the flow may receive a notice (e.g., event notice) that the electronic signature has been captured, and may proceed accordingly.

In certain embodiments, the techniques described herein may include processes useful in authenticating with an electronic signature system (e.g., DocuSign) via techniques such as OAuth2 authentication, as further described below. Once authenticated, an account of the electronic signature system may be queried for existing templates, and templates may be selected for further use by a Flow Designer system to create certain flows. A daemon process may also executed at certain times to synchronize changes to the templates, thus maintaining updates current. By providing for an electronic signature spoke, the techniques described herein may enable a more efficient development of processes, including human resource processes, that incorporate electronic signing of certain documents.

With the preceding in mind, the following figures relate to various types of generalized system architectures or configurations that may be employed to provide services to an organization accessing a cloud-platform, such as may be embodied in a multi-instance or multi-tenant framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 in which embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, in order to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules.

It would be beneficial to enable electronic signatures of client devices 20, 22 via certain processes provided by the data centers 18 and/or the virtual servers 26. Accordingly, an electronic signature system 28 may be provided to be used in processes that provide for user signing of certain documents, forms, and the like. In one embodiment, the electronic signature system 28 may be available from DocuSign, Inc., of San Francisco, Calif., USA. The electronic signature system 38 may be communicatively and/or operatively coupled to an electronic signature spoke or interface system 30. The electronic signature spoke 30 may provide, for example, for integration of the electronic signature system 28 into certain systems executing in the servers 18, 26, and/or processing data from the servers 18, 26, such as Flow Designer systems, as further described below.

Figure 2:
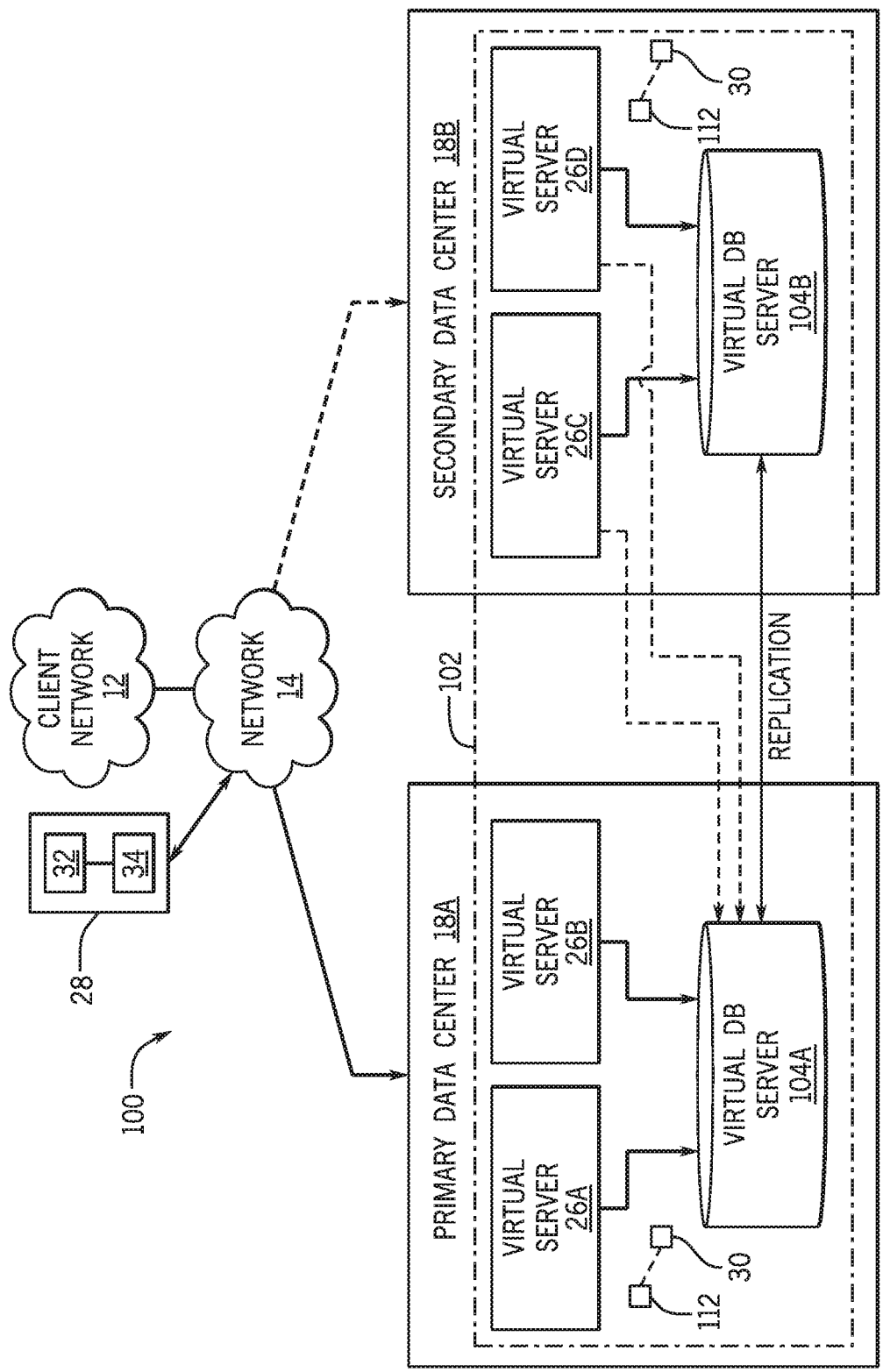
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

In the depicted embodiment, the electronic signature spoke 30 may provide for electronic signatures as a service. That is, the electronic signature spoke 30 may enable flows created, for example by a Flow Designer system 112, to operatively couple with the electronic signature system 28. The flows may then provide for electronic signing of a variety of documents, forms, and so on. In the depicted example, the virtual servers 26 and/or the virtual database servers 104 include or are operatively coupled to the electronic signature spoke 30 and to the Flow Designer system 112. Automation processes (e.g., flows) created by the Flow Designer system 112 as further described below may be created and/or used by a user authenticated by the electronic signature system 30, the virtual servers 26 and/or the virtual database servers 104. Further, software development activities, e.g., objects created via the Flow Designer system 112 may be created without resorting to typing in computer code.

The electronic signature system 28 may include one or more user accounts 32. Each user account 32 may create one or more templates 34 having one or more electronic signatures fields. Certain processes, such as a daemon process, a chron process, and the like, may continuously (or at a desired schedule) check for updates in the templates 34 to synchronize changes in the templates 34 with the electronic signature spoke 30. Accordingly, a more efficient creation and execution of automation processes that include electronic signatures may be provided by the techniques described herein.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server. Using FIG. 2 as an example, the virtual servers 26A, 26B, 26C, 26D and virtual database servers 104A, 104B may be combined into a single virtual server. The use and discussion of FIGS. 1 and 2 are only examples to facilitate ease of description and explanation of discrete or functional concepts and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
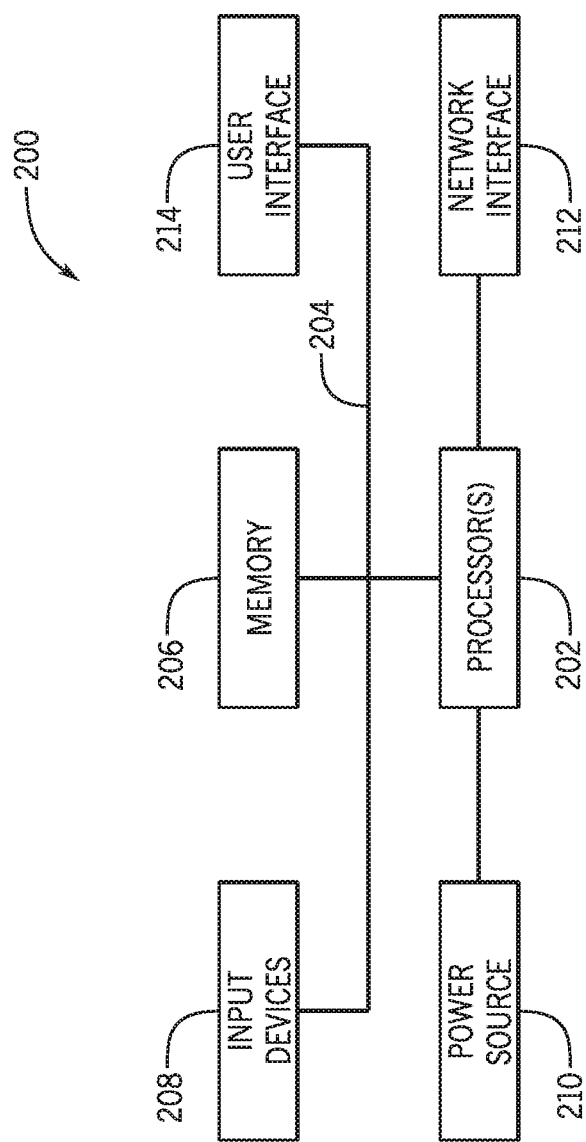
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 includes suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processor 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
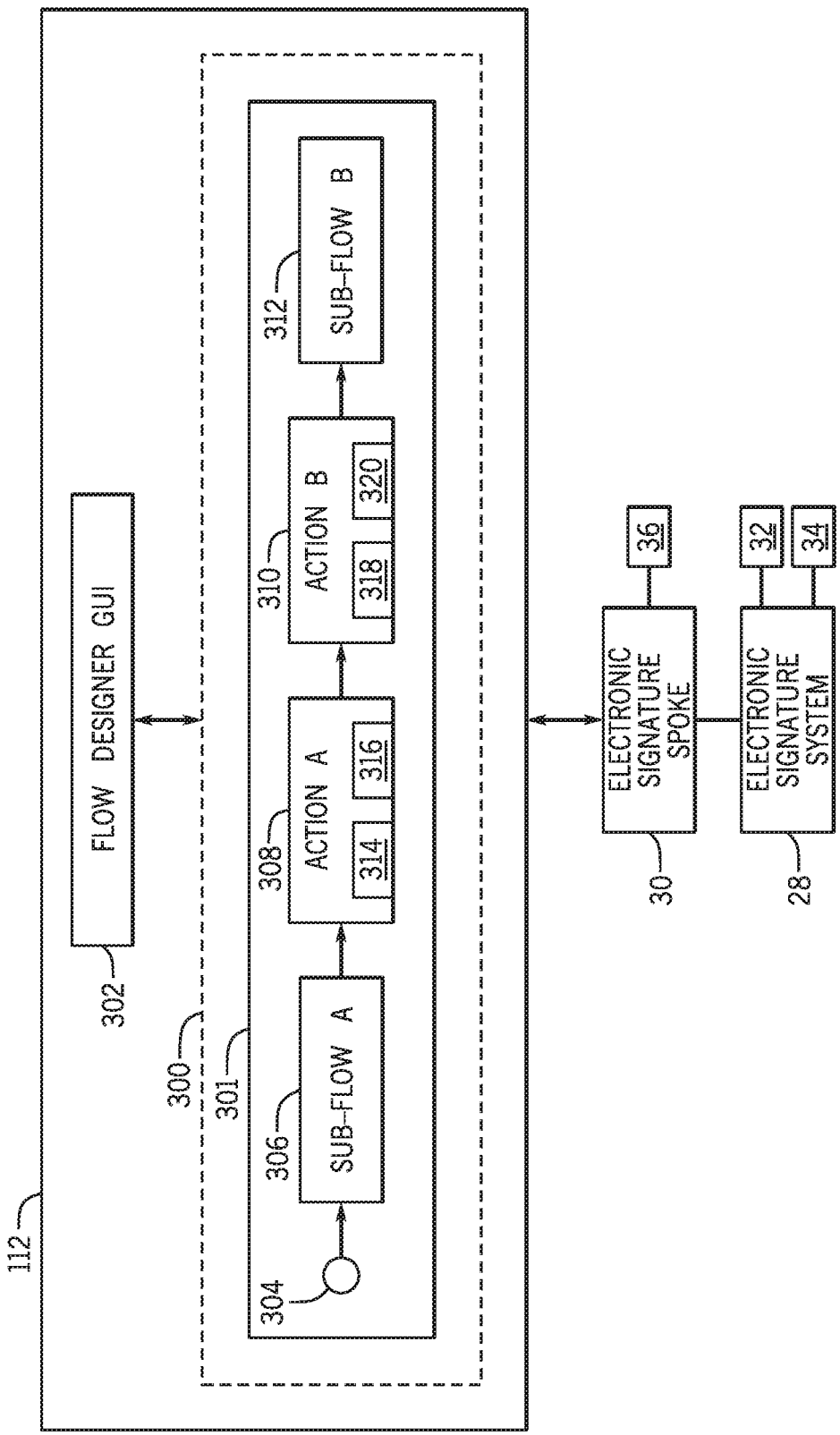
FIG. 4 is a block diagram illustrating a flow data processing system suitable for creating custom flow objects that may include electronic signature requests and subsequent electronic signature capture, in accordance with an embodiment.

It may be beneficial to describe certain computing resources that may be provided once the user has been authenticated via the multifactor authentication techniques described herein. Turning now to FIG. 4, the figure is a block diagram illustrating an embodiment of the Flow Designer system 112 suitable for creating information flow objects 300 that may include electronic signature requests and subsequent electronic signature capture. In the depicted example, the electronic signature spoke 30 may provide electronic signature processing in the Flow Designer system 112 via the electronic signature system 28. More specifically, the electronic signature spoke 30 may interface with the electronic signature system 32 to provide access to user accounts 32 and/or templates 34. During operations, authentication information may be used by the electronic signature spoke 30 to access certain objects via the user accounts 32, such as the templates 34. The authentication information may also be used by a daemon or a chron process 36 to determine if updates to the templates 34 have occurred. When updates have occurred, the electronic signature spoke 30 may synchronize with the updated templates 34 to provide for up-to-date objects and the like, that use and/or interface with the templates 34.

Once a user account 32 is authenticated (e.g., via OAuth2 authentication as further described below), then the user account 32 may be used to interface with and use the Flow Designer system 112. It is to be understood that the Flow Designer system 112 as depicted is an example only and may be included in or implemented using one or more of the virtual servers 26, the virtual DB servers 104, or a combination thereof. In the depicted embodiment, the Flow Designer system 112 includes a flow designer GUI 302, e.g., a visual information flow creation tool. The flow designer GUI 302 may provide for visual programming via natural languages as opposed to entering text representative of a computer program. The flow designer GUI 302 may include executable code or computer instructions suitable for creating, managing, accessing, and/or editing the flow objects 300. In the depicted embodiment, a single flow 301 is shown in the flow objects 300. It is to be understood that more than one flow may be provided in the flow objects 300.

The flow 301 may include a trigger 304 which may be "fired" or otherwise turned on by certain changed condition, such as a change in one or more records stored in a database (e.g., stored in the virtual DB servers 104). The trigger 304 may additionally be "fired" periodically, for example, as part of a schedule (e.g., hourly schedule, daily schedule, weekly schedule, monthly schedule, and so on). The trigger 304 may thus be used to initiate execution of other flow objects 300, such as sub-flow 306, Action 308, Action 310, and sub-flow 312.

In the depicted embodiment, the trigger 304 initiates execution of the sub-flow 306. The sub-flow 306 may include Actions, control logic (e.g., Boolean logic, branching logic, termination logic), other sub-flows, and so on. The sub-flow 306 may additionally take in inputs and provide outputs. For example, output of the sub-flow 306 may be used as input to the Action 308. The Action 308 may use the inputs provided to execute Steps 314, 316. The Action 308 may also include control logic. Steps, such as the Steps 314, 316, and may be self-contained code, such as scripts (e.g., Java, JavaScript code) provided by the manufacturer of the flow designer system 112. As an example, the Flow Designer system 112 may be provided by ServiceNow™ Inc., of Santa Clara, Calif., U.S.A., under the name Flow Designer™. The Steps 314, 316 may be additionally or alternatively provided by other third parties and/or coded by certain users, such as IT users.

Steps may include any number of functionality, such as requesting approval from other users of the servers 26, 104, creating records in a database table, editing the record in the database table, deleting the records in the database table, creating server tasks, logging messages, looking up database information, notifying of certain events (e.g., incidents, change requests, problems, changes to user records), executing scripts, such as JavaScript, sending email, waiting for a condition to occur, and so on. Action 310 may execute following Action 308. In turn, Action 310 may include Steps 318, 320, and upon completion of Step 320, sub-flow 312 may be executed. Once sub-flow 312 finishes execution, the flow 301 finishes. Flows, such as the flow 301, may not have outputs. The flows may be executable from external clients, such as a clients coupled to the client network 12 shown in FIG. 1.

The Actions 308, 310 may include electronic signatures techniques. That is, the Actions 308 and/or 310 may include documents, forms, and so on, including templates 34 and/or documents or forms based on the templates 34, that have one or more fields for electronic signing. The Actions 308 and/or 310 may also provide for user management of the accounts 32, and actions (e.g., query actions) for interacting with documents, templates 34, variables, and so on. The Actions 308 and/or 310 may also include or be operatively coupled to triggers (e.g., event triggers) to send electronic signature requests, set field actions, and so on. The Actions 308 and/or 310 may additionally retrieved and store signed documents in the servers 26, 104.

Figure 5:
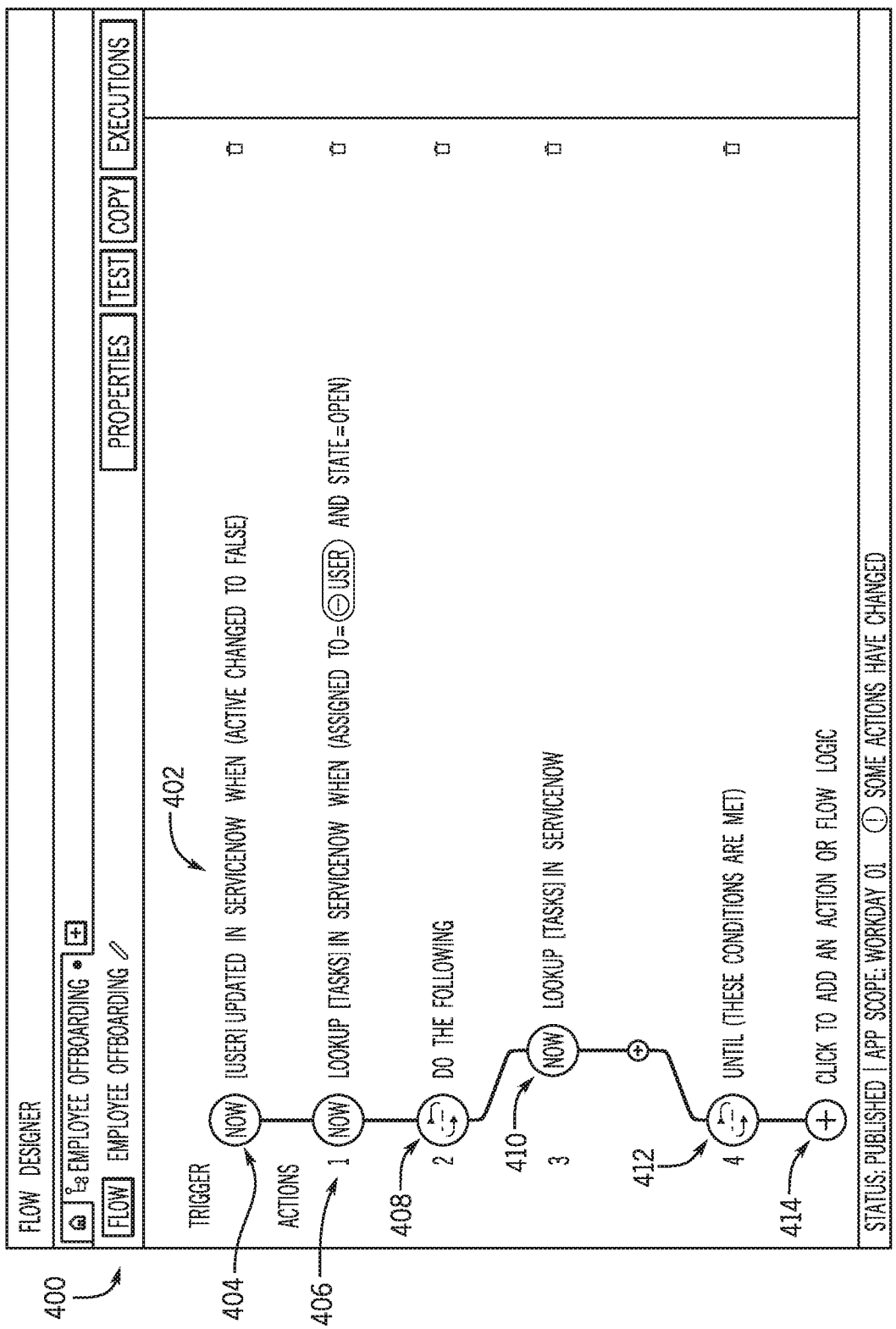
FIG. 5 is a screenshot of an embodiment of a graphical user interface (GUI) suitable for creating and/or editing flow objects, in accordance with an embodiment.

FIG. 5 is a screenshot depicting an embodiment of a graphical user interface (GUI) 400 suitable for inputting certain flow objects 300 into a flow, such as the flow 301. The GUI 400 may be accessible once the user 303 is authenticated via the authentication system 110 and used to create the flow 301 via the Flow Designer system 112. In the depicted embodiment, a graphical flow view 402 of a flow is shown. Indeed, the GUI 400 may be used to create and edit any number of graphical flow views that may then be executed as flow objects 300.

In the depicted embodiment, the graphical flow view 402 may start execution via a trigger 404. More specifically, if a certain user record is updated, then the trigger 404 may "fire" and execute Action 406. The Action 406 may then retrieve a set of tasks assigned to the updated user that have an open state. The retrieved tasks may then be further process via a "Do . . . Until" control logic. More specifically, a Do logic 408 may execute one or more Actions, such as Action 410, until the "Until" control logic 410 has its conditions met. More sub-flows and/or Actions may be added, for example, via the "+" control 414. As shown, natural language and visual composition via the flow designer 302 may be used to enable the creation of executable flow objects 300. The flow objects 300 may then be reused by clients connected to the network 12.

Figure 6:
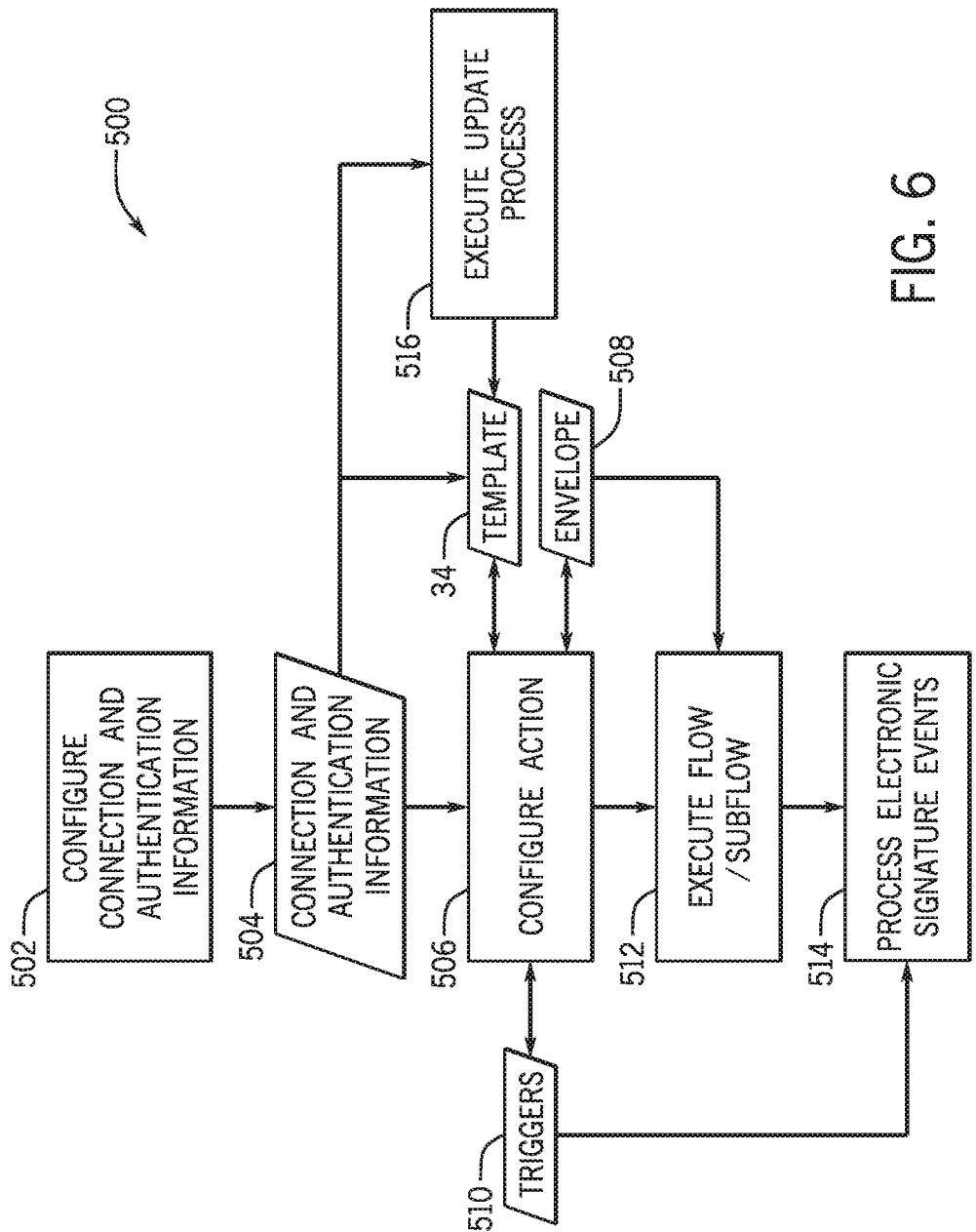
FIG. 6 is a flow chart of an embodiment of a process suitable for implement the techniques described herein, including providing electronic signatures as a service, in accordance with an embodiment.

Turning now to FIG. 6, the figure is a flow chart of an embodiment of a process 500 suitable for implement the techniques described herein, including providing electronic signatures as a service. The process 500 may be implemented as computer code or instructions executable by the one or more processors 202 and stored in the memory 206. In the depicted embodiment, the process 500 may configure (block 502) connection and/or authentication information 504 suitable for authenticating one or more users of the electronic signature system 28. In certain embodiments, the information 504 may include OAuth2 tokens, JSON web tokens (JWTs), URLs, URIs, cryptographic keys (e.g. RSA keys and the like), and so on, suitable for subsequent automated authentication into the electronic signature system 28 (e.g., DocuSign system) by systems such as the electronic signature spoke 30 and used to, for example, check for updates of objects such as the templates 34.

That is, a user may configure (block 502) certain connection information suitable for connecting to the electronic signature system 28 (e.g., DocuSign connection information) and for authenticating into the electronic signature system 28 (e.g., DocuSign service integration authentication information and/or user authentication information). The connection and authentication information 504 may then be securely stored by the electronic signature spoke 30 for subsequent use.

In one example, the connection and authentication information 504 may be used to query all templates 34 belonging, for example, to a user. One or more of the templates 34 may then be used to configure (block 506) a Flow Designer Action. For example, each template 34 may include documents, document fields, information about the sender, security and authentication information, and so on, that may be configured. The templates 34 may be reused, for example, by changing recipient information. Configuring (block 506) the Flow Designer Action may also include configuring an envelope 508. The envelope 508 may include similar information as a template 34 but may be designed for a one-time use as opposed to reuse. Accordingly, the envelope 308 may include documents, document fields, information about the sender, security and authentication information, recipient information, and so on, that may be configured.

Configuring (block 506) the template 34 and/or the envelope 508 for use in the Flow Designer Action may include creating the template 34 and/or the envelope 508, for example, in the electronic signature system 28. Once created, configuring (block 506) the Action may include specifying how the Action will enter certain information into the template 34 and/or the envelope 508, for example, during execution of the action. The information to be entered into the template 34 and/or the envelope 508 may include editable field information, tab information, role information (e.g., user role information), variables, and the like, that may be inserted into the template 34 and/or the envelope 508 during execution of the Action. For example, as the Action executes, certain variables may be calculated, and the variables inserted into the template 34 and/or the envelope 508.

Certain trigger information 510 may also be configured (block 506). For example, webhooks may be configured to receive status information from the electronic signature system 28 as a recipient receives documents and the like for signature, signs documents, and so on. The webhook may provide for callbacks from the electronic signature system 28, such as REST APIs that then update certain tables, objects, and so on, once an event, such as a signing event, has occurred.

During operations, the Action may be executed (block 512) as part of a Flow Designer Flow and/or subflow. The Action may derive certain variables, editable field data, tab information, role information (e.g., user role information), and the like, and insert (or update) the information into the template 34 and/or envelope 508. Likewise, certain triggers 510 may occur, such as a signing event, a receipt of a document event, and so on, during the execution (block 512) of the Action. The process 500 may then process (block 514) signature events, for example, as recipients receive documents for signature, as signatures occur, as signed documents are routed to other parties, and so on. The event processing (block 514) may include updating tables, objects, routing information, notifying certain users of events, and so on, as per Flow/subflow design.

In the depicted embodiment a daemon and/or chron process may execute (block 516) either continuously or at certain times to update changes to the templates 43. For example, a user may add the template 34, remove the template 34, edit a field in the template 34, and so on. When a change is detected (block 516), the process 500 may, for example, reconfigure (block 506) the Flow Designer Action to account for the change. By providing for visual Flow/subflow creation and integration with the electronic signature system 28, the techniques described herein may improve automated processes that include electronic signatures.

Figure 7:
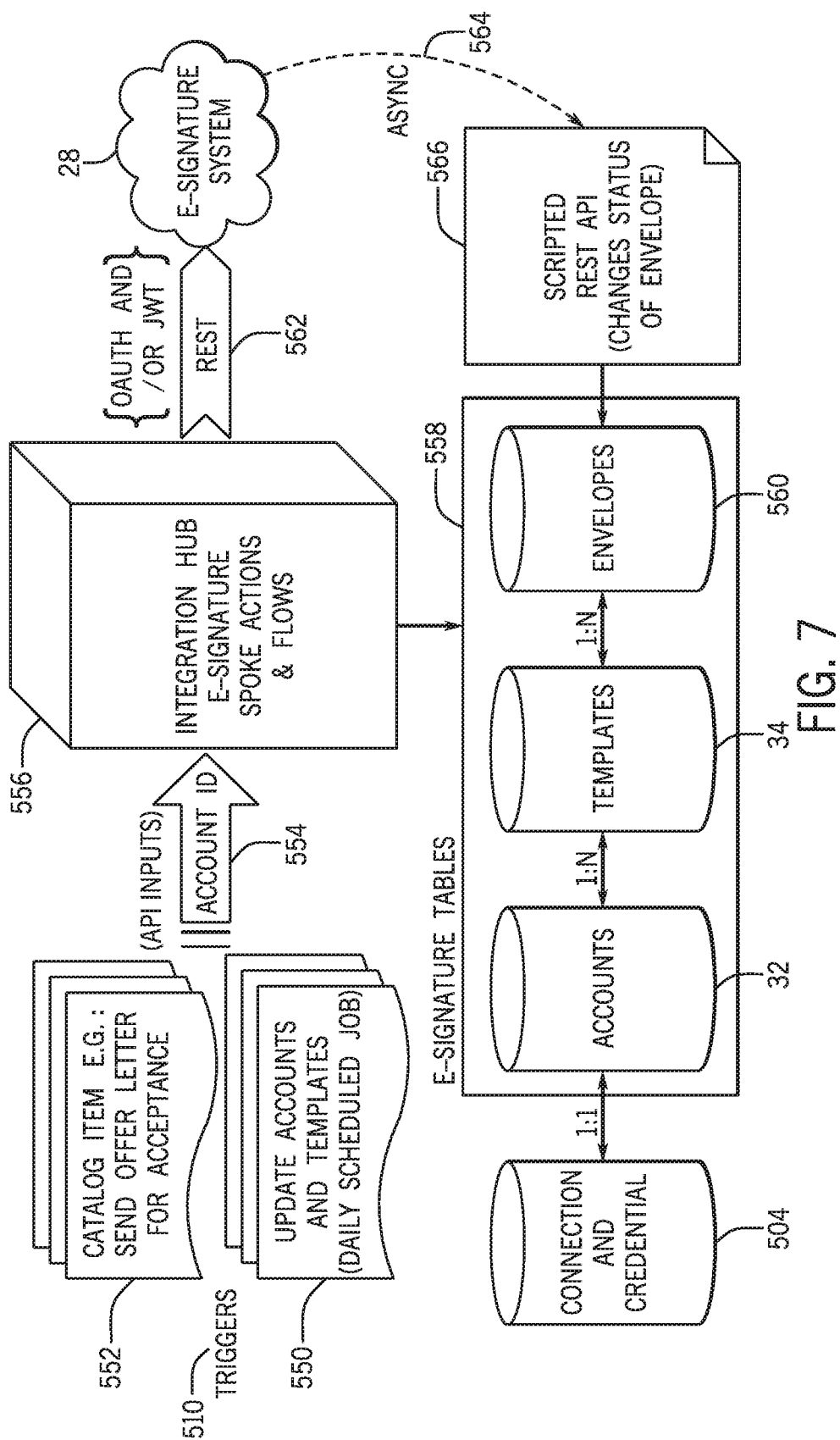
FIG. 7 is block diagram of embodiments of electronic signature objects and systems, in accordance with an embodiment.

Turning now to FIG. 7, the figure is block diagram of embodiments of certain objects and systems used to implement the techniques described herein. As mentioned earlier, certain triggers 510 may be used, as well as ongoing (daemon jobs) and/or scheduled (chron jobs) 550. Certain catalog items 552 may also be used. The catalog items 552 may include pre-configured items (e.g., Flows and/or subflows, Actions, Steps based on the templates 34) for a certain automated process, such as human resource (HR) processes that may be stored by the servers 24, 106. That is, flows and/or subflows based on the templates 34 may be provided for further use as catalog items 552, and in some cases, sold in an electronic store.

An account information 554 may be used to access Actions, Flows and/or subflows 556 that incorporate electronic signature processing. The Actions, Flows and/or subflows 556 may, during execution, access and/or update a set of electronic signature tables 558. For example, recipients may be tracked, status of signatures (unsigned, signed) may be updated, account 32, template 34, and/or envelope 560 information may be updated, and so on. As mentioned above, connection and authentication (e.g., credential) information 504 may be configured and used to work with the templates 34 and/or envelopes 560 accessible via the accounts 32. It is to be noted that in certain embodiments, the tables 558 may be stored in the servers 26, 104.

OAuth (e.g. OAuth2) and/or JWT may be used to authenticate with and interact with the electronic signature system 28 (e.g., DocuSign system). For example, a REST 562 API may use OAuth2 to interface with the electronic signature system 28 during operations. Webhooks may be used to create, for example, asynchronous callbacks 564. The callbacks 564 may execute, for example, a scripted REST API 566 when changes in envelope 560 status occur, changes in recipients occur, changes in templates 34 and so on. The scripted REST API 566 may then query and/or update the tables 558 based on the asynchronous callbacks 564.

Figure 8:
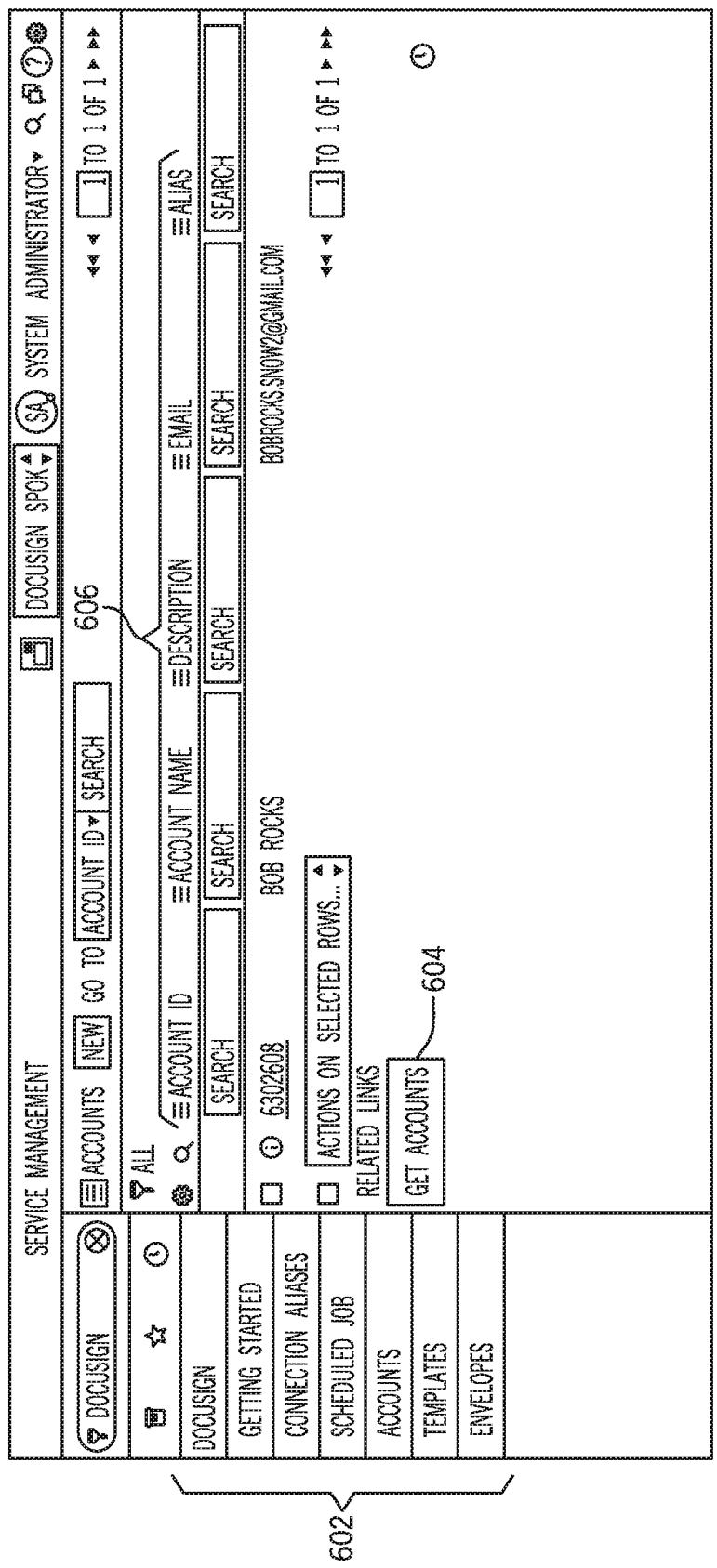
FIG. 8 is a screenshot of an embodiment of a graphical user interface (GUI) suitable for implementing certain electronic signature techniques, in accordance with an embodiment.
Figure 9:
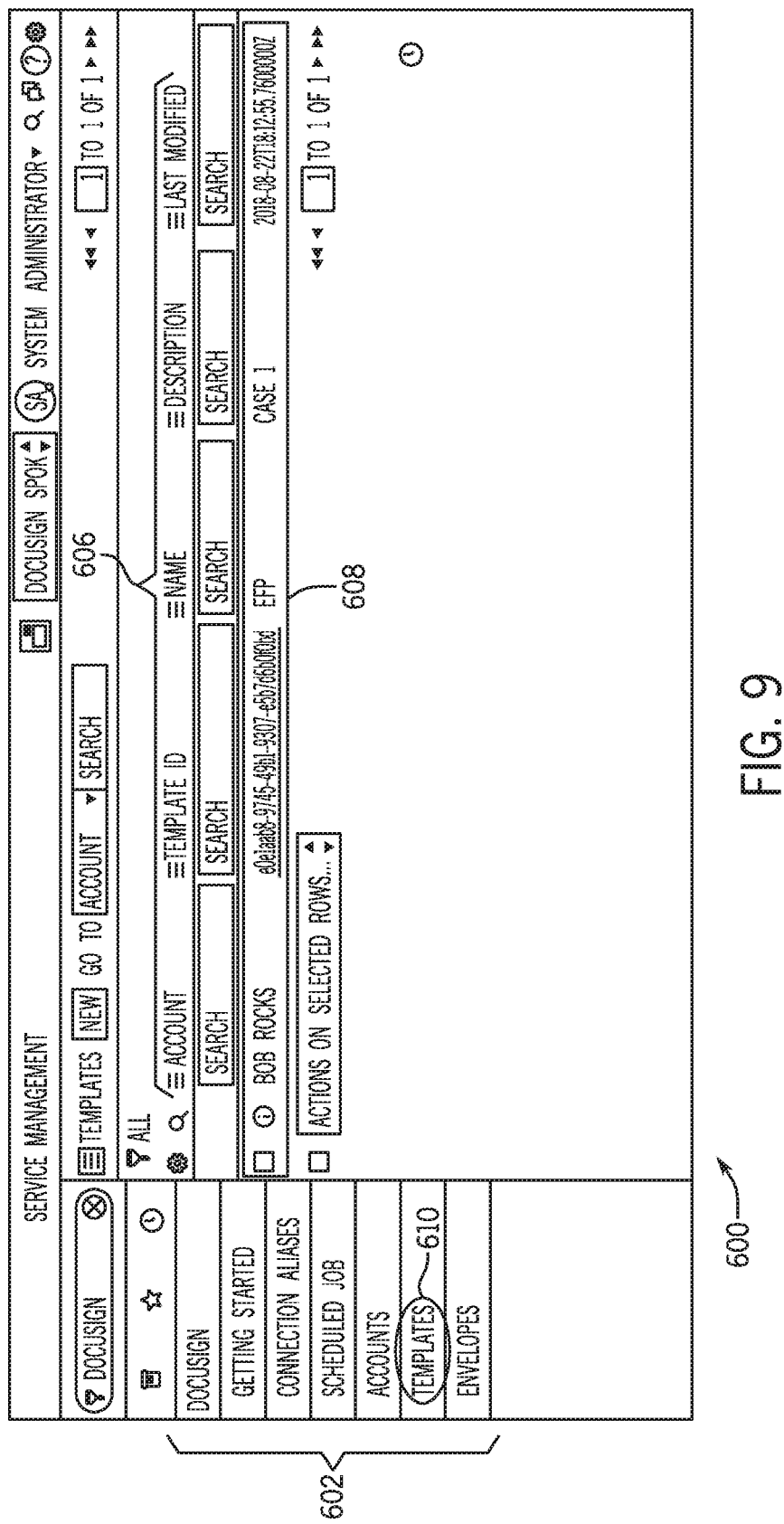
FIG. 9 is a screenshot of an embodiment of the GUI of FIG. 8 where a user may be selected, and templates for the selected user may then be retrieved.

FIG. 8 is a screenshot of an embodiment of a graphical user interface (GUI) 600 suitable for implementing certain electronic signature techniques described herein. In the depicted example, a section 602 may be used to select features such as connection information (e.g., connection aliases), scheduling jobs, listing accounts, templates 34, envelopes 560, and so on. In the depicted embodiment, a "Get Accounts" link 604 may be used to list in section 606 accounts that may be used to interact with the electronic signature system 28. FIG. 9 is a screenshot of an embodiment of the GUI 600 where a user 608 may be selected, and templates 34 for the selected user 608 may then be retrieved by actuating a control 610.

Figure 10:
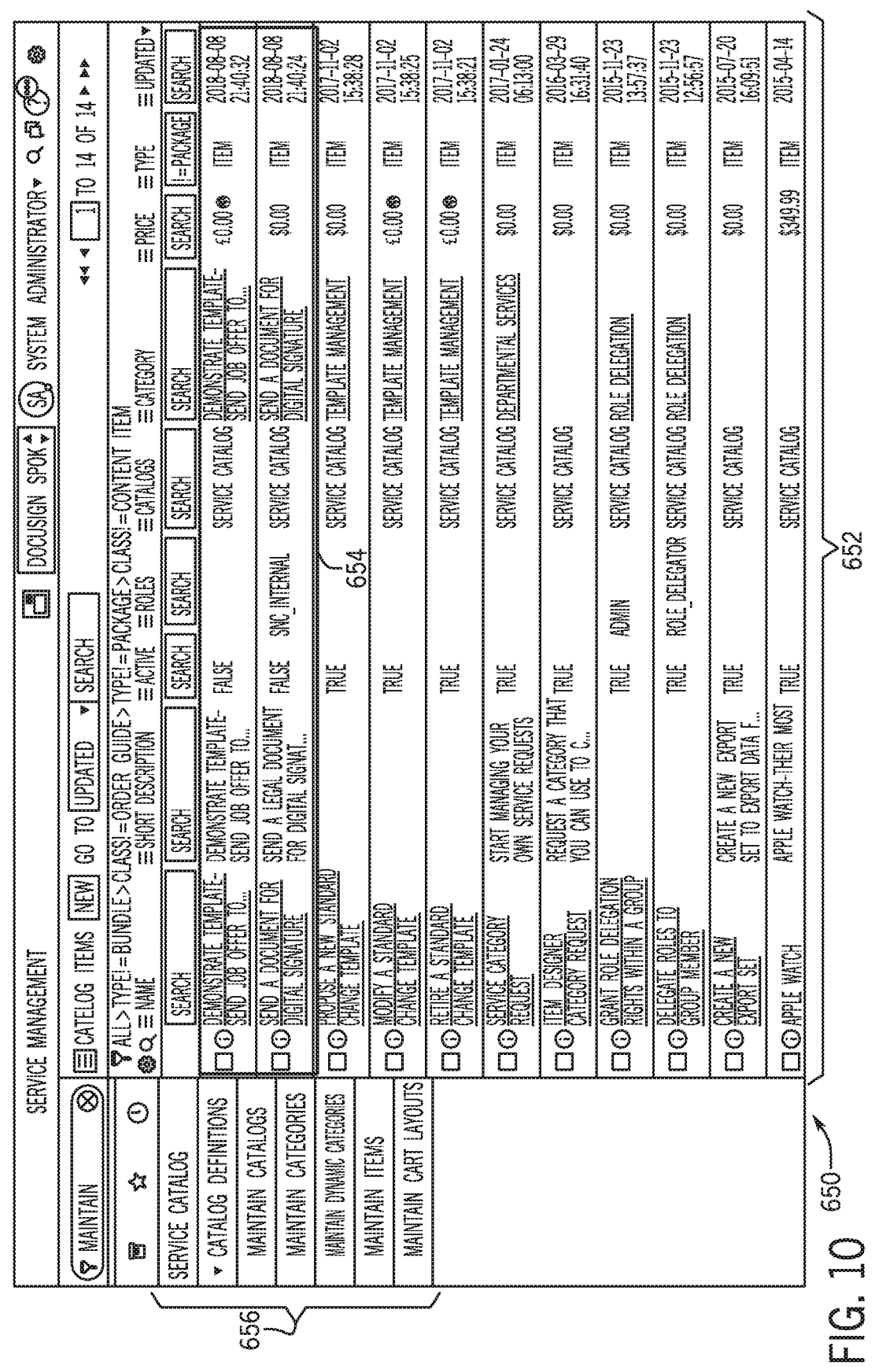

FIG. 10 is a screenshot of an embodiment of a GUI 650 showing a list 652 of catalog items that may be provided by querying certain tables in the servers 24, 106, which may include electronic signature tables 558. More specifically, items 654 may include items that participate in electronic signature processing. As mentioned earlier, the catalog items 654 may include Actions, Flows, and/or subflows that request signatures, enable signing of documents, forms, and the like, during execution of automated processes created via the Flow Designer system 112.

Figure 11:
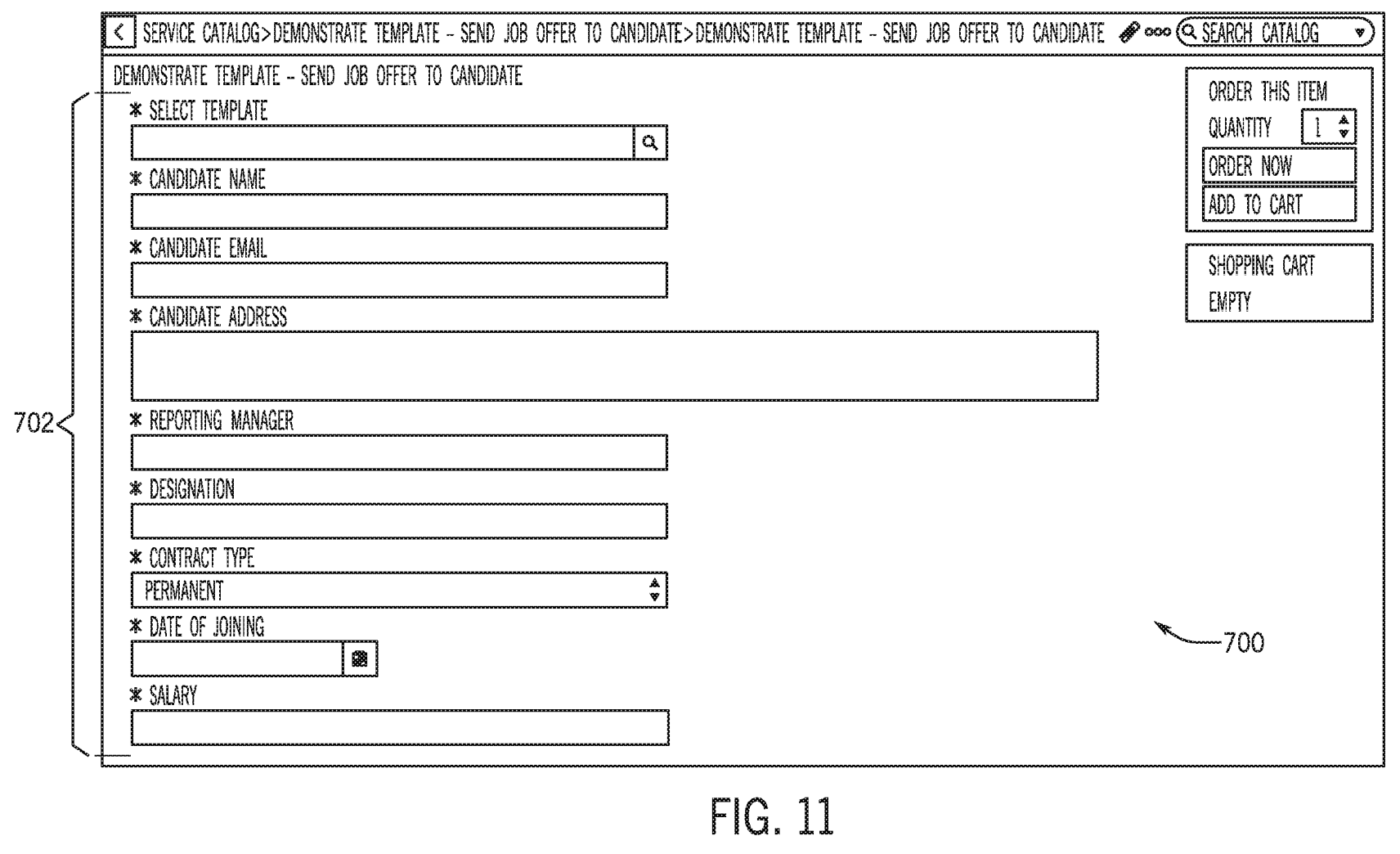

FIG. 11 is a screenshot of an embodiment of a GUI 700 illustrating multiple fields 702 suitable for entering information, for example, into the template 34. As mentioned earlier, the template 34 may be reused. Accordingly, the fields 702 may be used to enter information that would change from use-to-use, such as email information, date information, and so on. In the depicted embodiment, the fields 702 are directed at job offer information. It is to be understood that any type of process information may be supported, including HR process information, insurance information, IT information, code development information, banking information, real estate information, and so on.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
a server communicatively coupled to a data repository and configured to store a data in the data repository, wherein the server is configured to perform operations comprising:
creating, via a visual information flow creation tool, at least one information flow object, wherein creating, via the visual information flow creation tool, the at least one information flow object comprises creating a flow designer action object configured to include a connection information and an authentication information for communicating with an electronic signature system, wherein the connection information is used to connect to the electronic signature system and the authentication information is used to authenticate to the electronic signature system;
creating an electronic signature field in the at least one information flow object; and
providing the at least one information flow object to communicate an electronic signature request to the electronic signature system.

2. The computing system of claim 1, wherein the electronic signature request comprises an embedded electronic signature request, an emailed electronic signature request, or a combination thereof.

3. The computing system of claim 1, wherein the authentication information comprises an OAuth2 information configured to provide at least one token for use in subsequent communication with the electronic signature system.

4. The computing system of claim 1, wherein the server is configured to perform operations comprising creating a callback in the electronic signature system, wherein the callback is configured to execute when an electronic signature event occurs.

5. The computing system of claim 4, wherein the callback is configured to execute asynchronously when an electronic signature event occurs.

6. The computing system of claim 4, wherein the electronic signature event comprises a recipient signing the electronic signature request.

7. The computing system of claim 6, wherein the at least one information flow object is configured to update a database table based on the recipient signing the electronic signature request, to execute a second information flow object based on the recipient signing the electronic signature request, or a combination thereof.

8. The computing system of claim 1, wherein the server is configured to perform operations comprising creating an envelope having a recipient information to communicate the electronic signature request.

9. The computing system of claim 1, wherein the server is configured to perform operations comprising listing one or more templates available from the electronic signature system, and wherein creating, via a visual information flow creation tool, at least one information flow object comprises entering information into the one or more templates to create the at least one information flow object.

10. A method, comprising:
creating, via a visual information flow creation tool, at least one information flow object wherein creating, via the visual information flow creation tool, the at least one information flow object comprises creating a flow designer action object configured to include a connection information and an authentication information for communicating with an electronic signature system, wherein the connection information is used to connect to the electronic signature system and the authentication information is used to authenticate to the electronic signature system;
creating, via the visual information flow creation tool, an electronic signature field in the at least one information flow object; and
providing the at least one information flow object to communicate an electronic signature request to the electronic signature system.

11. The method of claim 10, wherein creating, via the visual information flow creation tool, the at least one information flow object comprises creating the at least one information flow object in lieu of entering text for a computer program.

12. The method of claim 10, comprising creating a callback in the electronic signature system, wherein the callback is configured to execute when an electronic signature event occurs.

13. The method of claim 12, comprising updating a database table when the callback is executed, executing a second information flow object when the callback is executed, or a combination thereof.

14. The method of claim 10, wherein the electronic signature request comprises an embedded electronic signature request, an emailed electronic signature request, or a combination thereof.

15. The method of claim 10, comprising creating an envelope having a recipient information to communicate the electronic signature request.

16. A non-transitory, computer-readable medium storing instructions executable by a processor of a computing system, the instructions configured to:
create, via a visual information flow creation tool, at least one information flow object wherein the instructions configured to create, via the visual information flow creation tool, the at least one information flow object comprise instructions configured to create a flow designer action object configured to include a connection information and an authentication information for communicating with an electronic signature system, wherein the connection information is used to connect to the electronic signature system and the authentication information is used to authenticate to the electronic signature system;
create, via the visual information flow creation tool, an electronic signature field in the at least one information flow object; and
provide the at least one information flow object to communicate an electronic signature request to the electronic signature system.

17. The computer-readable medium of claim 16, wherein the instructions configured to create, via the visual information flow creation too, the at least one information flow object, comprise providing for the creation of the at least one information flow object in lieu of entering text for a computer program.

18. The computer-readable medium of claim 16, comprising instructions configured to create a callback in the electronic signature system, wherein the callback is configured to execute when an electronic signature event occurs.

19. The computer-readable medium of claim 18, comprising instructions configured to update a database table when the callback is executed, execute a second information flow object when the callback is executed, or a combination thereof.

20. The non-transitory, computer-readable medium of claim 16, wherein the electronic signature request comprises an embedded electronic signature request, an emailed electronic signature request, or a combination thereof.

* * * * *